C. H. FISHER.
DIRIGIBLE LAMP APPARATUS.
APPLICATION FILED SEPT. 17, 1917.
1,263,399.
Patented Apr. 23, 1918.
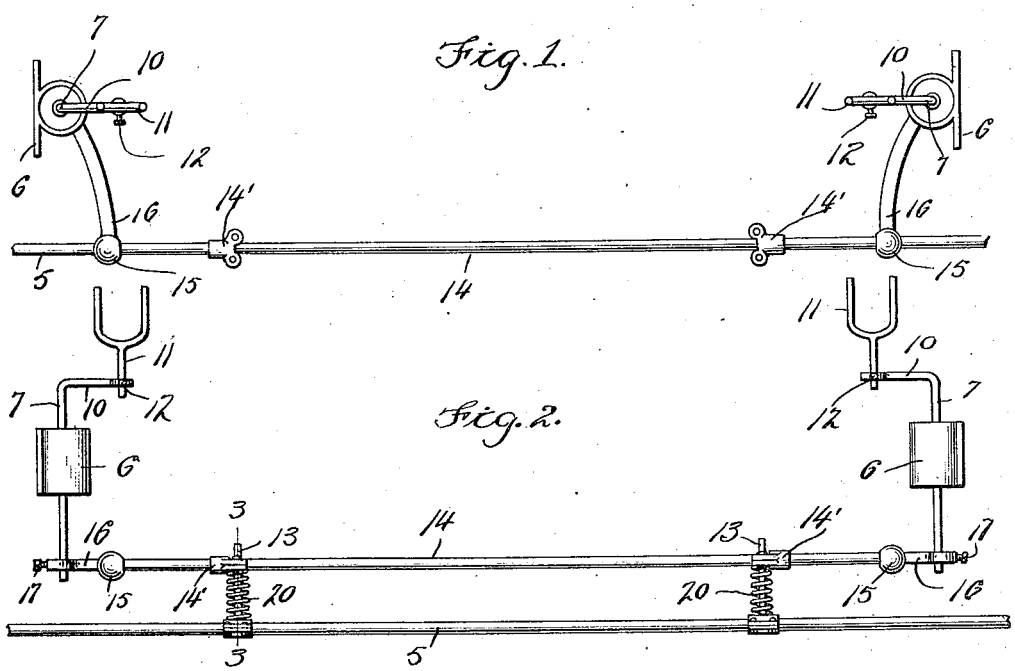
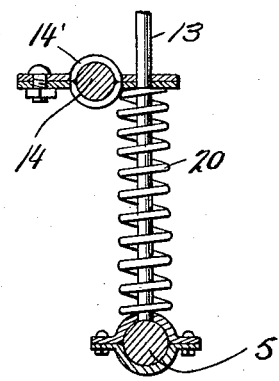
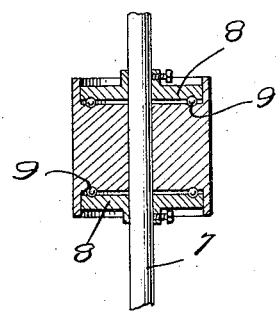
WITNESSES
INVENTOR
Charles H. Fisher.
BY
ATTORNEY

UNITED STATES PATENT OFFICE.

CHARLES H. FISHER, OF CARROLLTON, OHIO.

DIRIGIBLE-LAMP APPARATUS.

1,263,399. Specification of Letters Patent. Patented Apr. 23, 1918.

Application filed September 17, 1917. Serial No. 191,817.

*To all whom it may concern:*

Be it known that I, CHARLES H. FISHER, a citizen of the United States, residing at Carrollton, in the county of Carroll and State of Ohio, have invented certain new and useful Improvements in a Dirigible-Lamp Apparatus, of which the following is a specification.

This invention relates to dirigible lamps or headlights for use in connection with vehicles, and has for its primary object to simplify and generally improve structures of this character.

A further object of the invention is to provide a dirigible headlight apparatus which is composed of but few, simple and readily assembled parts, which is capable of being readily applied to vehicles of various types and constructions, which is governed by the operation of the steering apparatus of the vehicle, which may be readily disconnected from said steering apparatus if desired, and which will prove thoroughly practical and efficient in use.

With these objects in view together with others which will appear as the description proceeds, the invention resides in the novel formation, combination, and arrangement of parts, all as will be described more fully hereinafter, illustrated in the drawings and particularly pointed out in the claims.

In the drawing:

Figure 1 is a top plan view of a dirigible lamp apparatus constructed in accordance with the invention, and illustrating the manner in which the same is associated with the steering apparatus of a road vehicle.

Fig. 2 is a front elevation of the improved apparatus.

Fig. 3 is a sectional view taken on the line 3—3 of Fig. 2, and

Fig. 4 is a sectional view taken through the improved lamp support.

Referring now to the drawings, 5 indicates the connecting rod for the steering knuckles of a conventional form of motor vehicle, which is utilized to supply the power necessary for operating the lamps to be hereafter described.

In carrying out the invention, lamp brackets or lamp post supports indicated at 6 are employed, and each of these brackets provides a centrally disposed bore, through which the lamp supporting posts 7 extend. Each post is provided with a pair of spaced adjustable flanges or collars 8, which are adapted to confine the rollers or balls 9, whereby friction between the rotatable posts and the supporting brackets 6 is greatly reduced. The upper end of each of the lamp posts is offset at 10, and the free end of each offset portion is provided with a lamp supporting yoke 11. These yokes are held in their various positions of vertical adjustment by means of screws 12.

Secured in spaced parallel relation upon the rod 5 connecting the steering knuckles of the vehicle and projecting upwardly therefrom are standards 13. These standards slidably support a lamp connecting rod or bar 14, the latter being provided with clips 14' having vertically disposed apertures through which the standards 13 extend. Expansion springs 20 encircle the standards and bear at their ends against the connecting rod 5 and the clips 14', whereby the bar 14 is resiliently supported.

Pivoted at one end as at 15 to each end of the bar 14 are levers 16, the latter being adapted to operate the vehicle lamps, and the pivotal connection between said levers and bar is a ball and socket arrangement, as shown. These levers are secured at their opposite ends to the lower extremities of the vertically disposed lamp supporting posts 7. As shown in the drawing, set screws 17 effect the connection between the forward ends of the arms or levers 16 and the lamp supporting posts 7, and it is obvious therefore, that various adjustments between the said lamp posts and levers 16 may be made if desired. This particular construction is provided for the purpose of enabling the device to be applied to vehicles of various makes, sizes and types. It will be observed from the construction, that the standards 13 are detachably secured at their lower ends to the knuckle connecting rod, whereby the dirigible lamp apparatus may, when required, be readily detached from the steering apparatus of the vehicle.

In operation, the apparatus is arranged upon the vehicle in the manner illustrated in Figs. 1 and 2 of the drawing. Longitudinal movement of the connecting rods 5 will move the standards 13, and obviously the rod 14 will correspondingly move. This movement of the rod 14 will be transmitted through the levers 16 to the lamp supporting posts 7, whereupon the latter will rotate within their bearings. This rotation of the lamp posts causes the lamp yoke to correspondingly move, whereupon the light rays projected from the lamp will follow the course to be taken by the vehicle. Movement of the steering or connecting rod 5 in the opposite direction will reverse the direction of rotation of the lamp posts, and it is thus apparent that the lamps will always turn with the operation of the steering apparatus, and the light projected from the lamps will follow the course to be assumed by the vehicle. By yieldably supporting the bar 14, it is obvious that the vibrations which occur in the vehicle frame will not be transmitted to the said bar, and obviously the lamp mechanism cannot become disarranged or broken.

While the present is a disclosure of what is believed to be the preferred embodiment of the invention, it is to be understood that the invention is not limited thereto, as various changes in the minor details of construction, proportion and arrangement of parts may be resorted to if desired without departing from the spirit of the invention as defined by the appended claims.

What is claimed is:

1. The combination with a vehicle and the steering apparatus; of a lamp post rotatably mounted on said vehicle, a laterally movable rod, a lever connecting one end of said rod with said post whereby the latter will be rotated when said rod moves, a standard detachably connected at its lower end to the connecting bar of said steering apparatus, an apertured clip adjustably mounted on said rod, the said standard extending loosely through the aperture in said clip, and an expansion spring encircling said standard and bearing against said clip and bar.

2. The combination with a vehicle and the steering apparatus; of a lamp post rotatably mounted on said vehicle, a laterally movable rod, a lever connecting one end of said rod with said post whereby the latter will be rotated when the former moves, a sectional collar inclosing the connecting bar of said steering apparatus, a standard carried by said collar and projecting upwardly therefrom, a clip adjustably mounted on said rod, the said clip being disposed above said standard and having an aperture through which the latter loosely extends, and an expansion spring encircling said standard and bearing at its ends against said collar and clip respectively.

In testimony whereof I affix my signature in presence of two witnesses.

CHARLES H. FISHER.

Witnesses:
  Fred. W. McCoy,
  Mrs. Chas. Fisher.

Copies of this patent may be obtained for five cents each, by addressing the "Commissioner of Patents, Washington, D. C."